United States Patent
Douma

(10) Patent No.: US 8,991,305 B2
(45) Date of Patent: Mar. 31, 2015

(54) MILK FROTHING SYSTEM

(75) Inventor: Sipke Theo Douma, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 261 days.

(21) Appl. No.: 13/698,309

(22) PCT Filed: Jul. 1, 2011

(86) PCT No.: PCT/IB2011/052908
§ 371 (c)(1),
(2), (4) Date: Nov. 16, 2012

(87) PCT Pub. No.: WO2012/004711
PCT Pub. Date: Jan. 12, 2012

(65) Prior Publication Data
US 2013/0112083 A1  May 9, 2013

(30) Foreign Application Priority Data

Jul. 8, 2010 (EP) .................... 10168808

(51) Int. Cl.
*A47J 31/00* (2006.01)
*A47J 31/44* (2006.01)

(52) U.S. Cl.
CPC ........... *A47J 31/44* (2013.01); *A47J 31/4489* (2013.01); *A47J 31/4485* (2013.01); *Y10S 261/76* (2013.01); *Y10S 261/16* (2013.01)
USPC ............ 99/293; 99/323.1; 261/DIG. 76; 261/DIG. 16

(58) Field of Classification Search
CPC .................. A47J 31/4485; A47J 31/4489
USPC .......... 99/293, 323.1, 452, 453; 261/DIG. 76, 261/DIG. 16
See application file for complete search history.

(56) References Cited

U.S. PATENT DOCUMENTS

| | | | | |
|---|---|---|---|---|
| 4,922,810 A | * | 5/1990 | Siccardi | 99/323.1 |
| 5,778,765 A | * | 7/1998 | Klawuhn et al. | 99/290 |
| 6,006,654 A | * | 12/1999 | Pugh | 99/293 |
| 7,448,314 B2 | * | 11/2008 | Ioannone et al. | 99/452 |
| 7,507,430 B2 | | 3/2009 | Stearns et al. | |

FOREIGN PATENT DOCUMENTS

| | | |
|---|---|---|
| EP | 0392254 B1 | 10/1990 |
| EP | 0607759 A1 | 7/1994 |
| EP | 1776905 B1 | 4/2007 |
| EP | 1785074 A1 | 5/2007 |
| EP | 1949829 A1 | 7/2008 |
| EP | 2025270 A2 | 2/2009 |

* cited by examiner

*Primary Examiner* — Reginald L Alexander

(57) ABSTRACT

Milk frothing system (1) including a water conduit (10) that successively interconnects a water reservoir (11); a pump (12); a heater (15), configured to evaporate water; and a mixing node (31). The system further includes an air conduit (20) that successively interconnects an air inlet (21); a first check valve (22); a second check valve (24); and the mixing node. The system also includes a steam/air conduit (30) that successively interconnects the mixing node, and a frothing device (32). The milk frothing system additionally includes an expansion vessel (60), having a water chamber and an air chamber, said water chamber being connected to a point of the water conduit, downstream of the pump and upstream of the heater, and said air chamber being connected to a point of the air conduit, downstream of the first check valve and upstream of the second check valve provided therein.

13 Claims, 2 Drawing Sheets

MILK FROTHING SYSTEM

FIELD OF THE INVENTION

The present invention relates to a milk frothing system for producing steamed-milk foam, which system may be used with or integrated into a coffee machine such as, in particular, a (water)tank or reservoir type espresso machine.

BACKGROUND

A coffee machine may be fitted with a milk frothing system for preparing coffee types that include steamed-milk foam, such as for example a cappuccino or a caffèlatte. The general purpose of the milk frothing system in such a machine is to prepare or aid in preparing a milk foam comprised of tiny (preferably micro-size) bubbles and having a temperature in the range of about 50-70° C.

Known milk frothing systems may froth the milk by mixing steam, air and milk by means of a Venturi-pipe. Steam is then forced through the Venturi-pipe, creating an underpressure therein that is used to suck in both atmospheric air and milk through an air supply line and a milk supply line, respectively. The amount of milk and air that is sucked in is controlled via dosing restrictions in the respective supply lines. This approach is favorable from the point of view of manufacturing costs as it may require only one, typically electrically powered, pump for providing a steam generator with water to be vaporized, and to keep the system properly pressurized. Unfortunately, however, the mixing process within the Venturi-pipe may be somewhat violent and erratic, as a result of which milk residue may unintentionally end up in and further narrow the dosing restriction in the air supply line. Eventually, the air dosing restriction may even get blocked altogether, in which case the milk frothing system will stop functioning.

An alternative to sucking atmospheric air into a steam driven Venturi-pipe is to force compressed air into the steam line leading up to the Venturi, which Venturi may then be used exclusively to suck in milk. The use of compressed air may do away with the need for a vulnerable air dosing restriction, since a separate air pump or compressor may be used to both compress and meter the supply of air. An extra pump, however, would also raise the manufacturing costs of a milk frothing system, and consequently render this alternative less advantageous.

It is an object of the present invention to overcome or mitigate the aforesaid disadvantages of known milk frothing systems, and to provide an economically manufacturable milk frothing system in which the risk of congestion of an air supply line by milk residue is minimized.

SUMMARY OF THE INVENTION

One aspect of the present invention is directed to a milk frothing system. The milk frothing system may include a water conduit that, viewed in a downstream direction thereof, successively interconnects a water reservoir; a pump; a heater or thermoblock, configured to evaporate water in the water conduit; and a mixing node. The system may further include an air conduit that, viewed in a downstream direction thereof, successively interconnects an air inlet; a first check valve; a second check valve; and the mixing node. The system may also include a steam/air conduit that, viewed in a downstream direction thereof, successively interconnects the mixing node and a frothing device. The milk frothing system may additionally include an expansion vessel, having a water chamber and an air chamber, said water chamber being connected to a point of the water conduit downstream of the pump and upstream of the heater, and said air chamber being connected to a point of the air conduit downstream of the first check valve and upstream of the second check valve provided therein.

The disclosed milk frothing system operates in two alternating cycles: a frothing cycle and a rest cycle. During the frothing cycle, the pump is operative to provide flows of steam and air to the mixing node, so as to generate a steam/air mixture that is subsequently delivered to the frothing device for milk froth production. The steam is generated as the pump displaces liquid water from the water reservoir, via the water conduit, to the heater, which via the same water conduit is in fluid communication with the mixing node disposed downstream thereof. The flow of compressed air to the mixing node is effected by means of a two-chamber expansion vessel that is disposed between the water conduit and the air conduit. When the pump is operating to displace water from the water reservoir to the heater, it also pumps water into the water chamber of the expansion vessel. This causes any air in the air chamber of the expansion vessel to be compressed and forced out through the air conduit, towards the mixing node. During the rest cycle, the pump is inoperative and the water chamber of the expansion vessel is allowed to empty and depressurize. This gives the air chamber of the vessel time to take in fresh air via the air inlet or the air conduit, effectively recharging it for a next frothing cycle. The milk frothing system according to the present invention thus advantageously uses only one (water) pump to simultaneously feed the mixing node with both water (in the form of steam) and air.

According to an elaboration of the invention, the milk frothing system further comprises a water backflow conduit, which interconnects a point of the water conduit downstream of the pump and upstream of the heater, a backflow control valve, and a point of the water conduit downstream of the water reservoir and upstream of the pump.

The water backflow conduit provides a bypass around the pump, allowing water from the water chamber of the expansion vessel to flow back into the water reservoir during a rest cycle. The backflow control valve is configured to ensure that backflow of water occurs only during a rest cycle, i.e. when the pump is inoperative.

In one embodiment the backflow control valve may be a water pressure-operated, three-port valve that is disposed in the water conduit at a point downstream of the pump. Such a valve may be manufactured and implemented economically, in particular because it does not require an electric actuator, e.g. a solenoid or an electromotor, to function.

In an advantageous embodiment, the backflow control valve may comprise a first valve chamber, said first valve chamber having a first port that is connected to an upstream section of the water conduit. It may further comprise a second valve chamber, said second valve chamber having a second port and a third port, wherein the second port is connected to a downstream section of the water conduit, and wherein the third port is connected to the water backflow conduit. The backflow control valve may also comprise a flow restriction, interconnecting the first port and the second port, such that a flow of water through the water conduit gives rise to a pressure differential across the flow restriction and between the first and second valve chambers. A movable membrane may be sealingly disposed between the first valve chamber and the second valve chamber. The membrane may be capable of closing off the third port under the influence of a pressure differential caused by a pump-driven, downstream flow of water through the water conduit.

In another advantageous embodiment, the backflow control valve may comprise a valve chamber, said valve chamber having a first port that is connected to an upstream section of the water conduit; a second port that is connected to a downstream section of the water conduit; and a third port that is connected to the water backflow conduit. The third port may be wider than said second port, and preferably be provided in a side or bottom wall of the valve chamber. The backflow control valve may further comprise a float that is disposed in the valve chamber, and that is dimensioned such that it can close off the third port.

According to an elaboration of the milk frothing system, the water conduit may include a check valve, disposed downstream of the pump and upstream of the heater. The check valve may have a cracking pressure that can be reached or exceeded only when the pump is operative.

The check valve in the water conduit may serve to prevent the water chamber of the expansion vessel from draining into the heater during a rest cycle. Such draining would undesirably cause the heater to resume steaming (normally, the heater is empty at the end of a frothing cycle while the heater may still be at a sufficient temperature to evaporate water). The precise value of the cracking pressure may be dependent on the configuration of the system, but is generally such that it can be reached or exceeded only, at least for a sustained period of time, when the pump is operative. The cracking pressure may in particular be higher than the pressure that can be delivered, at least for a sustained period of time, to the check valve by pressurization of water by the discharging water chamber of the expansion vessel once the pump stops operating.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
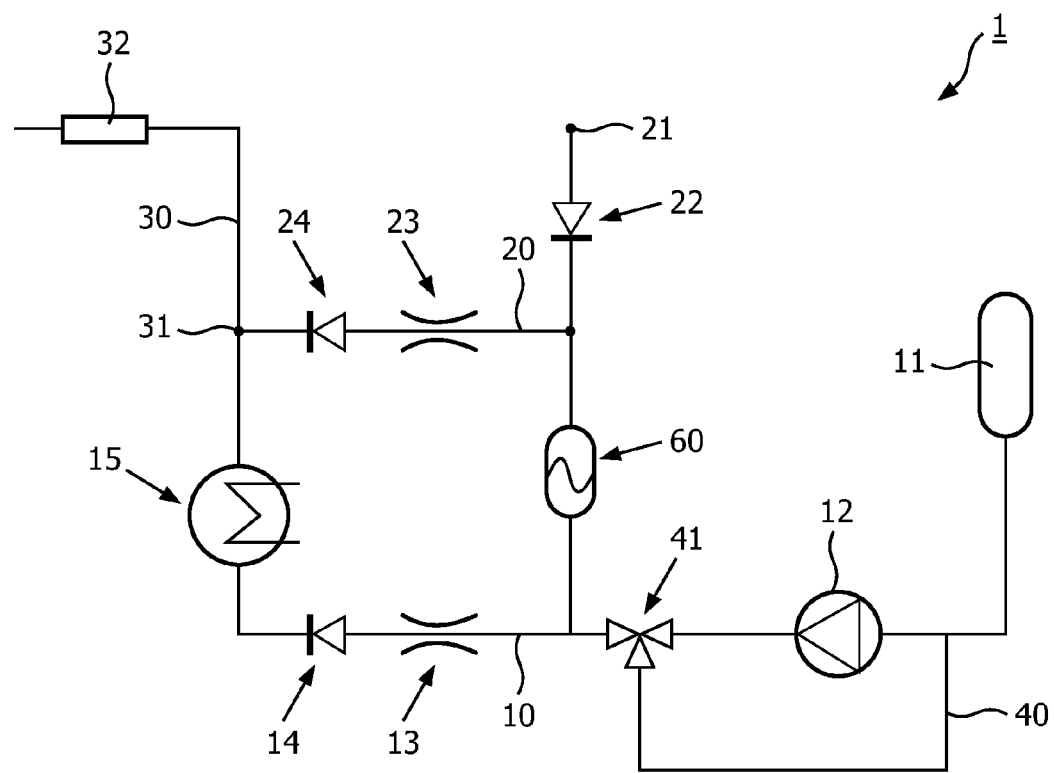
FIG. 1 shows a piping and instrumentation diagram of an exemplary milk frothing system according to the present invention.

FIG. 1 shows a piping and instrumentation diagram of an exemplary milk frothing system 1 according to the present invention. Within the depicted embodiment four primary, interconnected conduits may be distinguished: a water conduit 10, an air conduit 20, a steam/air conduit 30 and a water backflow conduit 40.

The water conduit 10 may extend from a water reservoir 11 to a mixing node 31. In between the water reservoir 11 and the mixing node 31, the water conduit 10 may successively include a pump 12, a water dosing or water flow restriction 13, a check valve 14 and a heater 15.

The water reservoir 11 may be any device suitable for holding or storing liquid water. In a typical embodiment, the water reservoir may take the form of a refillable water tank that may be detachably connectable to the water conduit 10.

The pump 12 may be any suitable type of pump capable of pumping water from the water reservoir, preferably at a continuous operating pressure (i.e. the pressure available at the pump outlet during continuous operation) in the range of 1-2 bars. In a typical embodiment, the pump 12 may be an electric vibration pump. Such pumps are known for their compactness, low maintenance and relatively low cost. In addition, a vibration pump can run dry without damage, which is highly practical in combination with a water reservoir 11 that may be emptied.

The water dosing restriction 13 in the water conduit 10 may serve to meter or dose the supply of water delivered to the heater 15. The dimensions of the water dosing restriction may depend on other parameters of the system 1 (e.g. the dimensions of the water conduit 10 and/or the operating pressure of the pump 12), and may typically be chosen such that water is delivered to the heater during pump operation at a volumetric flow rate in the range of 0.3-0.7 ml/s. The dimensions of the water dosing restriction 13 may be fixed, or be variable and controllable via flow restriction control means.

The check or one-way valve 14 in the water conduit 10 may be oriented such that it allows the flow of water from the pump 12 to the heater 15. The cracking pressure of the check valve 14, i.e. the minimum pressure differential required to open the valve, may preferably be chosen such that the check valve will open when the pump 12 is operative and close when the pump is inoperative. Accordingly, the primary purpose of the check valve 14 is to ensure that no water is provided to the heater 15 when the pump is turned off.

The heater 15 may be configured to heat and evaporate the liquid water supplied to it. It may preferably be configured to heat the water up to a temperature in the range of 120-160° C., e.g. about 140° C. The heater 15 may be of a conventional design, and in principle take any suitable form. One embodiment of the heater 15 may, for example, include a heating block of a thermally conductive material, e.g. aluminum, through which a section of the water conduit 10, possibly rolled up to form a coil, passes. At least the section of the water conduit 10 passing through the heating block may preferably be made of a heat resistant, heat conducting material, such as steel. The heating block may further comprise one or more heating elements, e.g. electrically powered resistive heating elements, to heat the heating block and hence the section of the water conduit 10 passing through it.

The air conduit 20 may extend from an air inlet 21 to the mixing node 31. In between the air inlet 21 and the mixing node 31, the air conduit may include a first check valve 22, an air dosing restriction 23 and a second check valve 24.

Both the first check valve 22 and the second check valve 24 may be oriented to enable air to flow from the air inlet 21 to the mixing node 31. The purposes of the two valves 22, 24 differ slightly, as will become clear from the discussion of the system's operation below.

The air dosing restriction 23 in the air conduit 20 may serve to meter or dose the supply of air to be mixed with steam at the mixing node 31. The dimensions of the air dosing restriction 23 may depend on other parameters of the system 1 (e.g. the dimensions of the air conduit 20 and/or the operating pressure of the pump 12), and may typically be chosen such that air is delivered to the heater 15 during pump 12 operation at a volumetric flow rate that is about ten times as large as the volumetric flow rate of the water that is simultaneously supplied to the heater 15. That is, the air flow rate may typically be in the range of 3-7 ml/s (at ambient pressure). The dimensions of the air dosing restriction 23 may be fixed, or be variable and controllable via air dosing restriction control means. It is understood that the air dosing restriction may typically take the form of a defined, local restriction in the air conduit 20. In some embodiments, however, the section of the air conduit 20 extending between the check valves 22, 24 itself may have such dimensions that the desired air dosing effect is achieved without a local restriction 23 within that section. In such embodiments, the air dosing restriction 23 may be considered to be embodied by said air conduit 20 section.

As is clear from FIG. 1, the water conduit 10 and the air conduit 20 may meet or merge at the mixing node 31, which from the perspective of both individual conduits 10, 20 may represent a most downstream point. From the mixing node 31, a steam/air conduit 30 extends to a frothing device 32.

The frothing device 32 may serve to prepare or aid in preparing a milk foam comprised of tiny, preferably microsize bubbles, and may take different forms. In the case that the frothing device 32 is configured to actually prepare or produce the milk foam, it may include a Venturi-pipe (or similar Venturi-effect device) whose main passage forms part of or is connected to the steam/air conduit 30. At its constriction, the Venturi may be connected to a milk supply line, which in turn may be connected to a milk reservoir. The milk supply line may include a fixed or variable and controllable milk dosing restriction. A downstream end of the Venturi may be provided with a nozzle for dispensing the froth produced. In the case that the frothing device 32 is configured to merely aid in preparing a milk foam, it may resemble a so-called 'steam wand'. It may then comprise little more than a steam/air outlet tube that may be used in combination with a jug of milk to produce the milk foam semi-manually.

As mentioned, the water conduit 10 and the air conduit 20 may be in fluid communication with each other at the mixing node 31. In addition, the two conduits 10, 20 may be in pressure communication with each other upstream of the mixing node 31, in particular via a two-chamber expansion vessel 60. A first or water chamber of the expansion vessel may be in fluid communication with the water conduit 10 at a point downstream of the pump 12 and upstream of the heater 15. A second or air chamber of the expansion vessel 60 may be in fluid communication with the air conduit 20 at a point in between the first 22 and the second 24 check valve provided therein, and more in particular at a point downstream of the first check valve 22 and upstream of the dosing restriction 23. The water and air chambers of the expansion vessel 60 may be separated by a flexible, possibly elastic membrane that may preferably be impermeable to both water and air.

The water backflow conduit 40 essentially forms a bypass of the water conduit 10, bypassing the pump 12. It may thus connect a point of the water conduit 10 upstream of the pump 12 to a point of the water conduit downstream of the pump.

Figure 2:
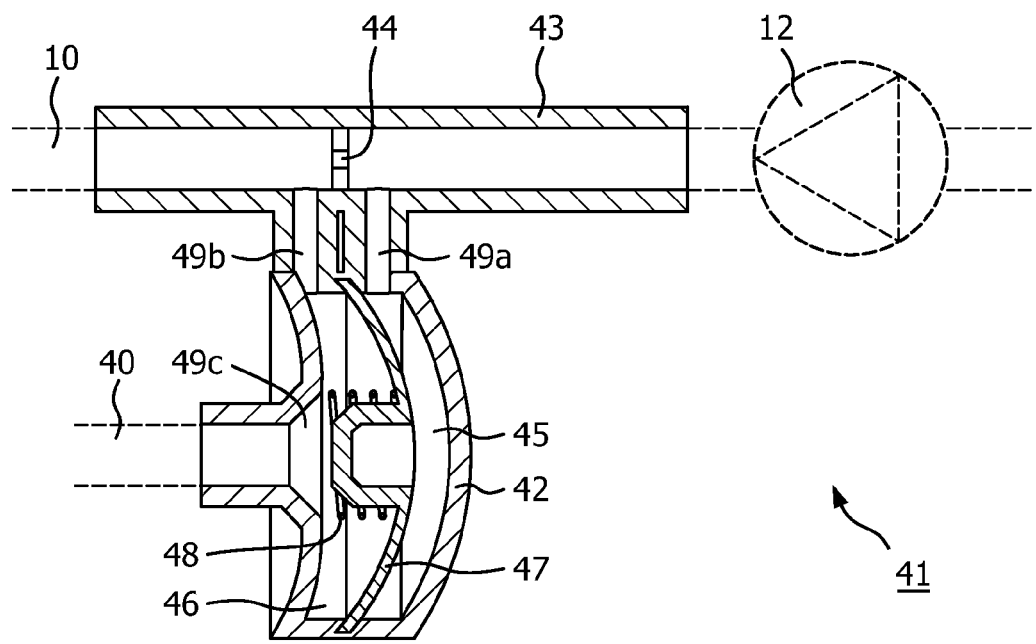
FIG. 2 is a schematic cross-sectional view of a first exemplary control valve for use with the milk frothing system of FIG. 1.
Figure 3:
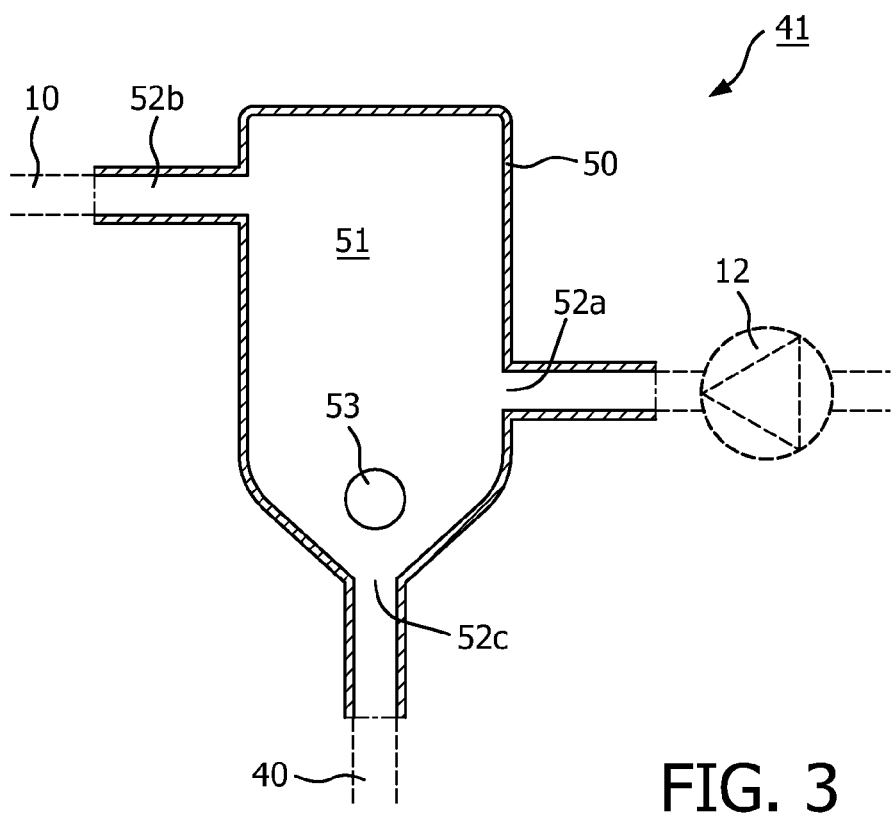
FIG. 3 is a schematic cross-sectional view of a second exemplary control valve for use with the milk frothing system of FIG. 1.

The water backflow conduit 40 may include a control valve 41. The control valve 41 may be of any suitable (valve) type. It may further be configured to allow a flow of water through the water backflow conduit 40 (in particular to a point of the water conduit 10 upstream of the pump 12) when the pump 12 is turned off, and to prevent a flow of water through the water backflow conduit 40 when the pump 12 is operating and pumping water in a downstream direction of the water conduit 10. To effect the aforementioned behavior of the control valve 41, it may be controlled in any suitable way. In one embodiment, the control valve 41 may include an electromechanical valve, e.g. a solenoid valve or a motor-operated ball valve, whose operation may be controlled by a controller or processor, possibly in dependence on signals received from one or more sensors. In another preferred economical embodiment, however, the control valve 41 may be entirely mechanical and configured to be operated by the water pressure in the water conduit, more in particular the water pressure in the water conduit section downstream of the pump 12 and upstream of heater 15. FIGS. 2 and 3 each show an exemplary embodiment of such a mechanical control valve 41. Both embodiments are configured as a three-port or three-way valve that may be disposed in the water conduit 10 at a point immediately downstream of the pump 12, and have a port or connection to the water backflow conduit 40. One skilled in the art will appreciate, however, that other embodiments of the control valve 41 may have a different number of ports, for example two in the case that the control valve 41 is disposed somewhere halfway the water backflow conduit 40.

FIG. 2 is a schematic cross-sectional view of the first exemplary embodiment of the control valve 41. In this embodiment, the control valve 41 may comprise a housing 42 that defines a space, which space may be divided into a first 45 and a second 46 valve chamber by a movable and/or flexible membrane 47. The membrane 47 may be impermeable to water and form a seal between the first and the second valve chamber 45, 46, respectively. In addition, it may serve as a valve capable of closing off the port 49c between the second valve chamber 46 and the (piping of the) water backflow conduit 10. A spring 48 may bias the membrane 47 towards a position in which the port 49c is open. The first and the second valve chamber 45, 46 may each be in fluid communication with an insert conduit 43 via a first port 49a and a second 49b port, respectively. The insert conduit 43, which may be configured to be inserted into (i.e. to form part of) the water conduit 10 at a point immediately downstream of the pump 12, may comprise a flow restriction 44 that is disposed in between the first port 49a and the second port 49b. The end of the insert conduit 43 that is in open (i.e. unrestricted by said flow restriction 44) communication with the first chamber 45 may be connected to an upstream/pump 12 side point of the fluid conduit 10, while the end of the insert conduit 43 that is in open communication with the second chamber 46 may be connected to a downstream/heater 15 side point of the water conduit 10.

The operation of the first embodiment of the control valve 41 is as follows. When the pump 12 is operating, it will draw water from the water reservoir 11 and force it through the water conduit 10, including the insert conduit 43. The flow restriction 44 provided therein hinders the flow, which causes a pressure difference across it. Via the first and second ports 49a, 49b, these pressure differences are communicated to the first and second valve chambers 45, 46, respectively, so as to cause a pressure differential across the membrane 47. An operating pump 12 thus causes the pressure in the first valve chamber 45 to be greater than the pressure in the second valve chamber 46. Consequently, the membrane 47 will move against the (relatively small) spring force to close off the port 39c to the water backflow conduit 40. When the pump 12 is turned off, the pressure differential across the membrane 47 drops below the level required to balance the spring force. The spring 48 will then force the membrane 47 in a position in which it no longer blocks the port 49c between the second valve chamber 36 and the water backflow conduit 40. This brings the section of the water conduit 10 downstream of the control valve 41 and upstream of the heater 15 in open communication with the water reservoir 11.

FIG. 3 is a schematic cross-sectional view of the second exemplary embodiment of the control valve 41. This second embodiment may comprise a single valve chamber 51 with three ports 52a, 52b and 52c. The valve 41 may be disposed in the water fluid conduit 10 at a point immediately downstream of the pump 12 by means of ports 52a and 52b. Port 52a may connect to an upstream/pump 12 side of the fluid conduit 10, while port 52b may connect to a downstream/heater 15 side of the fluid conduit 10. Port 52c, in turn, may connect to the water backflow conduit 40. The ports 52a-c may not all have the same dimensions; in particular, port 52c may be restricted in the sense that is has smaller dimensions than at least port 52b, such that it allows a smaller flow rate at a same pressure differential. The valve chamber 51 may further contain a float 53 having dimensions that enable it to close off port 52c when forced against the edge thereof. The float 53 may have a modest buoyancy.

The operation of the second embodiment of the control valve 41 is as follows. When the pump 12 is operating, it may draw water from the water reservoir 11 and force it into the valve chamber 51 through port 52a. The water may escape from the valve chamber 51 either via port 52b or via port 52c. As port 52b is restricted compared to port 52c, water will primarily tend to exit the valve chamber 51 through the latter. However, a predominant flow of water through port 52c may drag along the float 53 and bring it into contact with the (edges of) port 52c. As a result of the pressure differential across the port 52c (maintained by the pump 12), the float 53 may block the port 52c, which may force the water to escape from valve chamber 51 via port 52b.

When pump 12 is turned off, and the pressure differential across port 52c is cancelled, the buoyancy of the float 53 may lift it from its blocking position, and bring ports 52b and 52c in otherwise free fluid communication.

Now that the general construction of the milk frothing system 1 of FIG. 1 has been elucidated, attention is invited to its operation.

As mentioned above, the milk frothing system 1 operates in two alternating cycles: a frothing cycle, and a rest cycle.

During the frothing cycle, the pump 12 is operative to provide flows of steam and air to the mixing node 31, so as to generate a steam/air mixture that is subsequently delivered to the frothing device 32 for milk froth production. Steam is generated as the pump 12 displaces liquid water from the water reservoir 11, via the water conduit 10, to the heater 12, which via the same water conduit 10 is in fluid communication with the mixing node 31 disposed downstream thereof. Due to the flow of the water in the water conduit 10 downstream of the pump 12, the control valve 41 closes off the water backflow conduit 40, thus allowing no water to recirculate. The pressurization of the water in the water conduit 10 downstream of the pump 12 further ensures that (i) the cracking pressure of the check valve 14 is overcome, even despite the steam pressure that is building up on the downstream/heater 15 side of the valve, and (ii) that the water chamber of expansion vessel 60 is filled and pressurized. The flexible membrane in the expansion vessel 60 that separates the water chamber from the air chamber allows the water chamber to expand at the cost of the volume of the air chamber. This results in the compression of air in the latter, which in turn causes pressurization of the air in the air conduit 20 section between the first and the second check valve 22, 24. By virtue of the orientation of the check valves 22, 24, the air pressurization effects a downstream flow of air through the air dosing restriction 23 and the second check valve 24 into the mixing node. The frothing cycle may end when the supply of air in the air chamber of the expansion vessel 60 is exhausted, and hence no steam/air mixture can be produced anymore. Then the pump 12 is turned off.

Switching off the pump 12 marks the onset of the rest or regeneration cycle. As the pump-driven flow of water in the water conduit 10 stops, the control valve 41 opens up the water backflow conduit 40. This allows the water in the still pressurized water chamber of the expansion vessel 60 to flow back into the water conduit 10 and, via the control valve 41, back into the water tank 11. In the case that a check valve 14 with a suitable cracking pressure is provided just upstream of the heater 15, no water is allowed into the heater. The backflow of water from the expansion vessel 60 may be driven by the elasticity of the membrane that separates its air and water chambers. Alternatively, the backflow of water may be driven by gravity. In this case, the water tank may be disposed at a lower vertical level than the expansion vessel 60. As water flows from the water chamber of the expansion vessel 60, the air chamber expands causing the pressure therein to drop. Consequently, the air chamber will attempt to suck in air via the air inlet 21 of the air conduit 20. The first check valve 22 enables this intake of air, while the second check valve 24 prevents the air chamber from sucking in water vapor and/or milk residue from the steam/air conduit 30 downstream of the mixing node. The second check valve 24 may thus shield the air conduit 20, and more in particular the air dosing restriction 23, from contamination. Once the water chamber of the expansion vessel 60 has wholly or partly drained, and the air chamber has been refilled with fresh air, the milk frothing system is ready for another frothing cycle, which may be started by switching on the pump 12.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

The invention claimed is:

1. A milk frothing system, comprising:
    a water conduit that, viewed in a downstream direction thereof, successively interconnects:
        a water reservoir;
        a pump;
        a heater, configured to evaporate the water in the water conduit; and
        a mixing node;
    an air conduit that, viewed in a downstream direction thereof, successively interconnects:
        an air inlet;
        a first check valve;
        a second check valve and
        the mixing node;
    a steam/air conduit (30) that, viewed in a downstream direction thereof, successively interconnects:
        the mixing node; and
        a frothing device;
    an expansion vessel comprising a water chamber and an air chamber, said water chamber being connected to a point of the water conduit, downstream of the pump and upstream of the heater, and said air chamber being connected to a point of the air conduit, downstream of the first check valve and upstream of the second check valve provided therein.

2. The milk frothing system according to claim 1, further comprising:
- a water backflow conduit, which interconnects:
  - a point of the water conduit, downstream of the pump and upstream of the heater;
  - a backflow control valve; and
  - a point of the water conduit, downstream of the water reservoir and upstream of the pump.

3. The milk frothing system according to any claim 1, wherein the backflow control valve is a water-pressure operated, three-port valve that is disposed in the water conduit at a point downstream of the pump.

4. The milk frothing system according to claim 3, wherein the backflow control valve comprises:
- a first valve chamber, said first valve chamber having a first port that is connected to an upstream section of the water conduit;
- a second valve chamber, said second valve chamber having a second port and a third port, wherein the second port is connected to a downstream section of the water conduit, and wherein the third port is connected to the water backflow conduit;
- a flow restriction, interconnecting the first port and the second port, such that a flow of water through the water conduit gives rise to a pressure differential across the flow restriction and between the first and the second valve chamber; and
- a movable membrane, sealingly disposed between the first valve chamber and the second valve chamber, and capable of closing off the third port under the influence of a pressure differential caused by a pump-driven downstream flow of water through the water conduit.

5. The milk frothing system according to claim 3, wherein the backflow control valve comprises:
- a valve chamber, said valve chamber having:
  - a first port that is connected to an upstream section of the water conduit;
  - a second port that is connected to a downstream section of the water conduit; and
  - a third port that is connected to the water backflow conduit, said third port being wider than said second port;
- a float, disposed in the valve chamber, and dimensioned such that it can close off the third port.

6. The milk frothing system according to claim 1, wherein the water conduit further includes a third check valve, disposed downstream of the pump and upstream of the heater, said check valve having a cracking pressure that can be reached or exceeded only when the pump is operative.

7. The milk frothing system according to claim 1, wherein the air conduit includes an air dosing restriction, disposed between the first check valve and the second check valve.

8. The milk frothing system according to claim 1, wherein the water conduit further includes a water dosing restriction, disposed downstream of the pump and upstream of the heater.

9. The milk frothing system according to claim 1, configured such that—during operation—steam and air are mixed at the mixing node at a volumetric water flow rate to volumetric air flow rate ratio between 1:5 and 1:15, said volumetric flow rate ratio being determined at ambient pressure and temperature.

10. The milk frothing system according to claim 1, wherein the pump is a vibration pump.

11. The milk frothing system according to claim 1, wherein the frothing device comprises a Venturi-pipe having a milk supply line connected thereto at a constricted portion thereof.

12. The milk frothing system according to claim 1, wherein the frothing device comprises a steam wand.

13. A coffee machine comprising a milk frothing system according to claim 1.

* * * * *